(12) United States Patent
Fong et al.

(10) Patent No.: US 7,512,882 B2
(45) Date of Patent: Mar. 31, 2009

(54) SYSTEMS AND METHODS FOR PROVIDING ALTERNATE VIEWS WHEN RENDERING AUDIO/VIDEO CONTENT IN A COMPUTING SYSTEM

(75) Inventors: Jeffrey Fong, Seattle, WA (US); Mark Gibson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 10/751,863

(22) Filed: Jan. 5, 2004

(65) Prior Publication Data

US 2005/0149872 A1      Jul. 7, 2005

(51) Int. Cl.
   *G06F 15/00* (2006.01)
   *G06F 13/00* (2006.01)
(52) U.S. Cl. ...................... 715/716; 715/728
(58) Field of Classification Search ......... 715/704–705, 715/716, 718–723, 728–730, 851, 853–854
See application file for complete search history.

(56) References Cited

U.S. PATENT DOCUMENTS 6,031,529 A * 2/2000 Migos et al. ................ 715/783
6,097,380 A   8/2000 Crites et al.
6,452,609 B1 * 9/2002 Katinsky et al. ............ 715/716

OTHER PUBLICATIONS

Realnetworks announces support for microsoft internet explore 5 Mar. 18, 1999.*
Horry, Y. et al., "A passive-style buttonless mobile terminal," *IEEE Trans. on Consumer Electronics*, 2003, 49(3), 530-535.
Scott, D., "Mixview: a portable graphics-based soundfile editor and processor," *Proceedings, ICMC Glasgow*, Sep. 10-15, 1990, Glasgow, UK, 262-266.
Södergard, C. et al., "Integrated multimedia publishing: combining TV and newspaper content on personal channels," *Computer Networks*, 1999, 31, 1111-1128.

* cited by examiner

*Primary Examiner*—Kevin Nguyen
(74) *Attorney, Agent, or Firm*—Woodcock Washburn LLP

(57) ABSTRACT

Systems and methods for transitioning between alternate views when rendering A/V content in a computing system are provided. In various embodiments, a "Now Playing" state is exposed to a user experiencing media on a media device via a user interface, wherein the "Now Playing" state has a plurality of associated "Now Playing" views. The user interface allows the user to change "Now Playing" views based on media type and, if desirable, offer quick access settings. Advantageously, when transitioning between or cycling through the "Now Playing" views, the state of the user interface remains the "Now Playing" state.

28 Claims, 12 Drawing Sheets

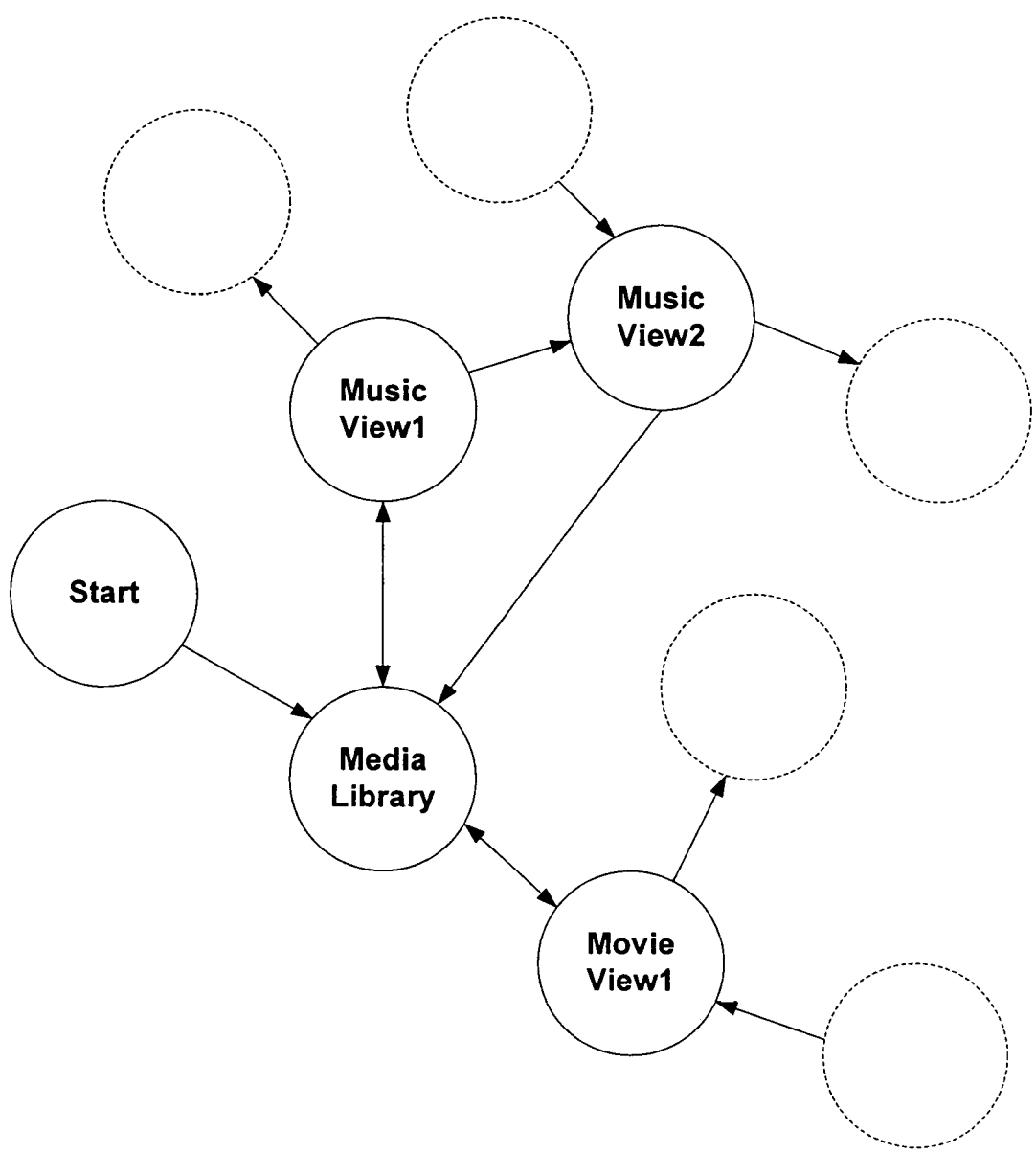
FIG. 1 – Prior Art

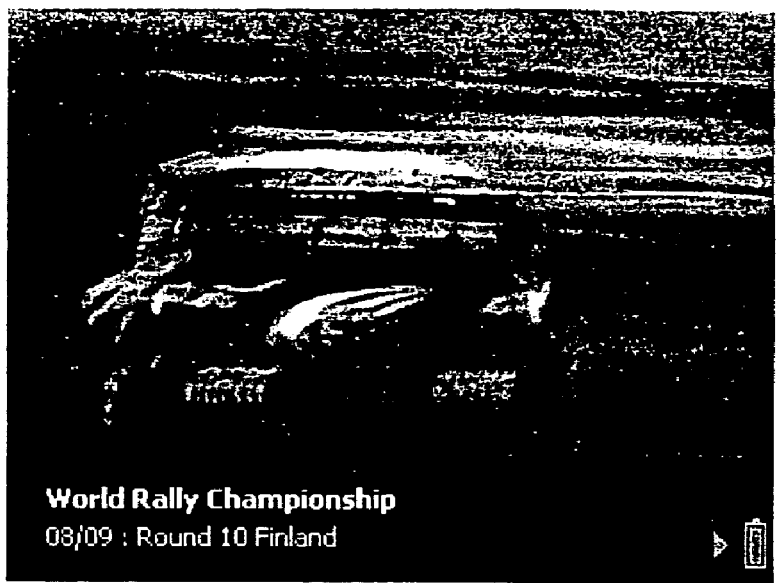
FIG. 6A — 600
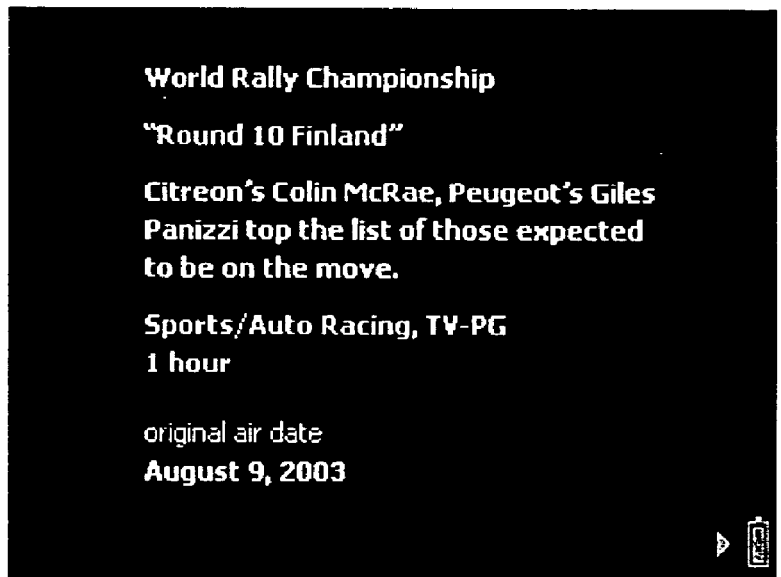
FIG. 6B — 610

740

FIG. 8A — 800
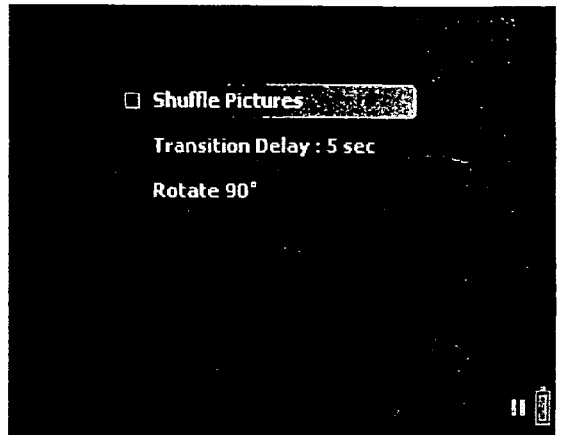
FIG. 8B — 810
FIG. 8C — 820

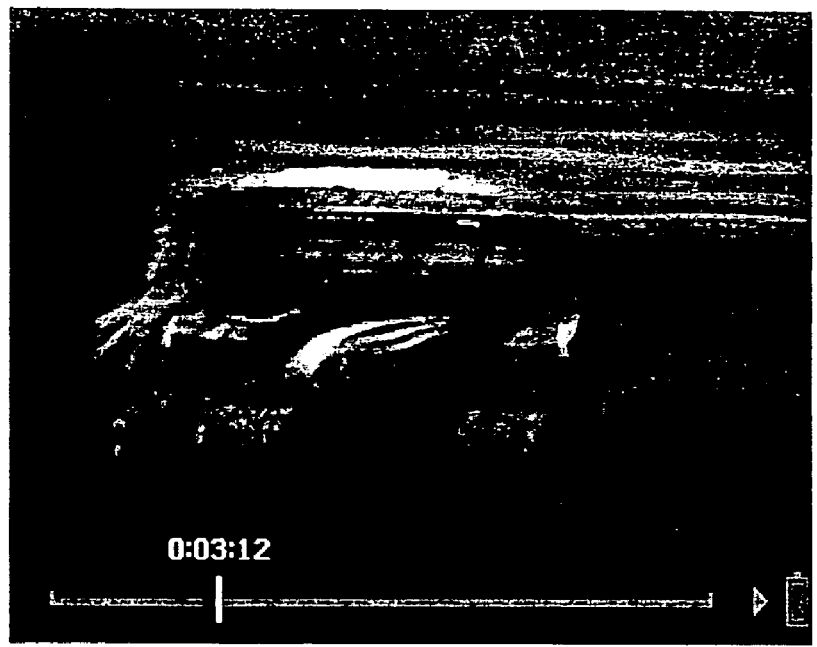
FIG. 9A — 900
FIG. 9B — 910

SYSTEMS AND METHODS FOR PROVIDING ALTERNATE VIEWS WHEN RENDERING AUDIO/VIDEO CONTENT IN A COMPUTING SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

This invention relates to the provision of different views when rendering audio/video (A/V) content in a computing system. More particularly, the invention relates to the provision of different "Now Playing" views, which collectively enable unique state transitioning and a rich user interface media experience.

BACKGROUND

Along with increased availability of digital media of all types and varieties, devices for rendering the media have proliferated as well. And yet, for all of such proliferation, the user interface model applied when rendering the media has remained largely the same. In particular, existing user interface models for rendering media treat different media types differently, and for each view of a media type being rendered, treat the view as a different independent user interface state, having its own entry and exit points. This can be particularly frustrating for users who possess portable media devices with limited user interface real estate including a variety of media types in their media library.

Under the traditional hierarchical model for navigating media, a user first selects a top level category, such as "Albums," or "Artists," or "All Songs." A list is associated with the top level category, and the user selects an element from the list. Then, there may be one or more sub-categories associated with the element selected, all of equal hierarchical weight. For instance, in the case of the selection of a particular Album from a list of Albums, a list of songs associated with the selected Album appears for the user's further selection. Since generally, a "song" is the atomic element of music navigation, there is no further sub-navigation, and selection of the song results in its being rendered, or otherwise selected for some operation. This type of navigation is not that much different than the navigation of a traditional hierarchical file management system, wherein a folder is selected, and then sub-folders of equal hierarchical weight appear, and sub-folders can be selected with similar drilling down until atomic elements, such as files, that can not be subdivided further are reached.

Under current models for rendering media, as illustrated in FIG. 1, once a media object is selected for rendering, the media is rendered according to a view for the media type, e.g., Music View1. While the user can navigate to another state, represented by Music View2, the user must explicitly select the alternate view and leave the current state, and cannot cycle through alternate views in a wrapping circular fashion. Current media rendering displays also do not preserve the user's settings and last view displayed for when the user renders similar media objects.

Thus, there is a need in the art for an improved user interface for a media rendering experience. There is a need for a user interface that is simple, i.e., not complicated or cluttered, with an intuitive design whereby it is easy to find media and play it back. There is further a need for a user interface that emphasizes the rendering of the media. There is still further a need for a user interface that dovetails with the implementation of a user interface in a smaller form factor, such as may be included in a portable or handheld media player.

SUMMARY OF THE INVENTION

In consideration of the above-identified shortcomings of the art, the present invention provides systems and methods for providing and transitioning between alternate views when rendering A/V content in a computing system. In various embodiments, for instance, the invention offers a "Now Playing" state having a plurality of associated "Now Playing" views for a media experience via a user interface that allows the user to change "Now Playing" views based on media type and, if desirable, change settings. Advantageously, when transitioning between or cycling through the "Now Playing" views, the state of the user interface remains the "Now Playing" state.

Other advantages and features of the invention are described below.

BRIEF DESCRIPTION OF THE DRAWINGS

The systems and methods for providing alternate views for rendering A/V content in accordance with the present invention are further described with reference to the accompanying drawings in which:

FIG. 1 is an exemplary diagram illustrating the state of prior art user interfaces for rendering media;

FIGS. 6A and 6B illustrate exemplary non-limiting implementations of "Now. Playing" views for rendering Recorded TV content in accordance with the invention;

FIGS. 8A and 8C illustrate exemplary non-limiting implementations of "Now Playing" views for rendering Picture content in accordance with the invention; and FIGS. 9A and 9B illustrate exemplary non-limiting implementations of "Now Playing" views for rendering Video content in accordance with the invention.

DETAILED DESCRIPTION OF THE INVENTION

Overview

Figure 2A:
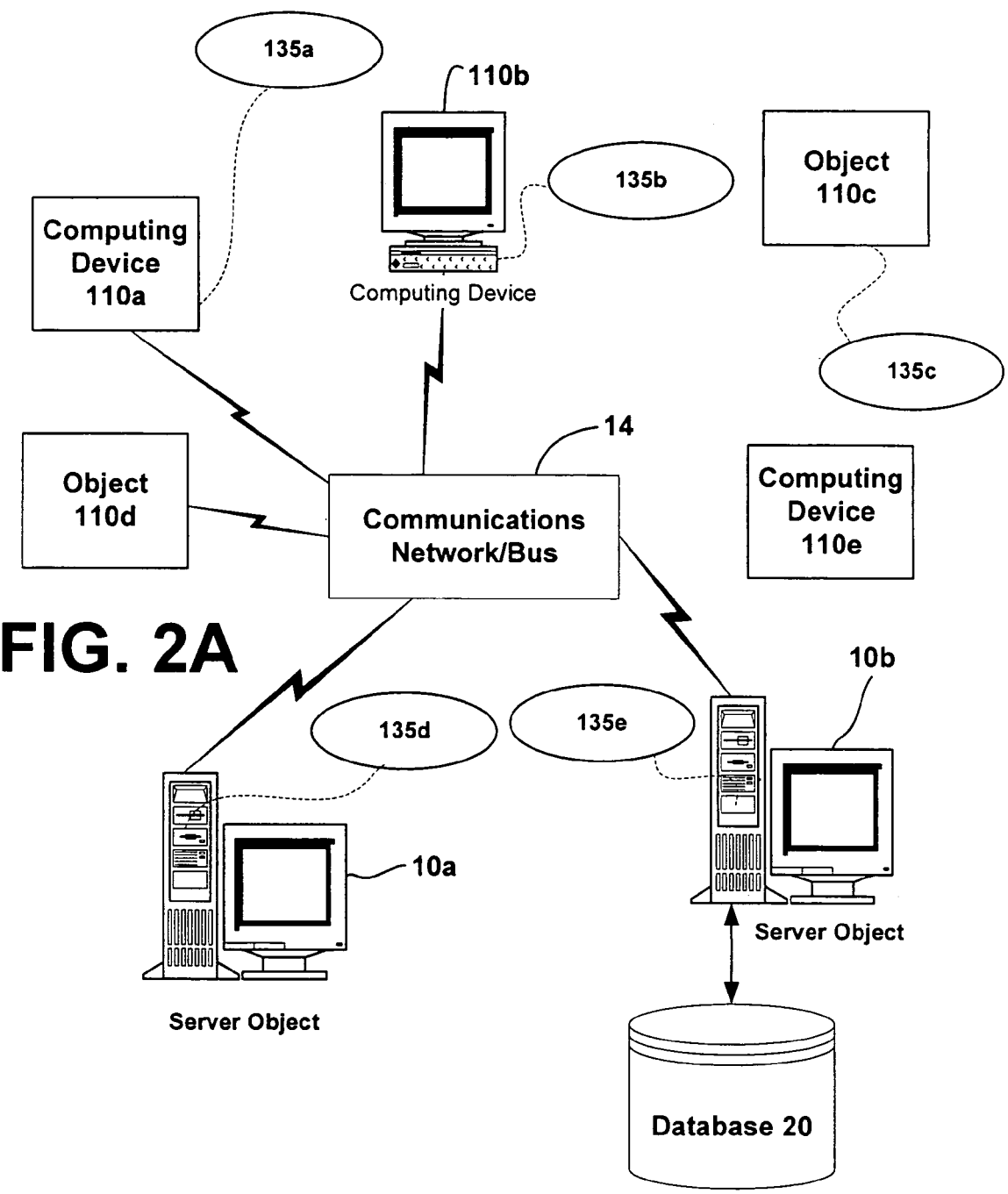
FIG. 2A is a block diagram representing an exemplary network environment having a variety of computing devices in which the present invention may be implemented.

User interfaces for media rendering devices such as portable media players, portable audio players, set top boxes, portable video recorders, media centers and the like can be improved beyond the static transitioning model that exists today. Current mobile device and other digital entertainment experiences offer limited concepts of views on currently playing media. The invention thus offers a "Now Playing" place for a user experience that allows the user to change views based on media type and, if desired, configure settings and defaults for the various views that present the rendering of the media. In one aspect, the invention provides a plurality of sets of "Now Playing" Views for A/V Presentations, the sets corresponding to the type of the media objects being rendered. By exposing media objects to the user according to different views, the user experience is enhanced allowing a user to choose from a set of ways to view the media being rendered, the sets being tailored to type of media object.

The "Now Playing" is where the user enjoys media objects, such as media files. In an exemplary non-limiting device, for instance, the user can listen to music, play video content (TV content as well as other kinds of video) and watch slideshows. Each media type has different playback capabilities and different available metadata and thus "Now Playing" views expose the available metadata and the rendering of the content differently for each media type. In one embodiment, the Now Playing place is a horizontal band of screens consisting of one or more views of the currently playing media and a playback settings screen and the set of views is based on the type of media being played.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the user interface of the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. Storage of media objects lends itself to having a plurality sources for the media objects, and to having different types of media objects and types of storage, and thus the user interface of the invention is particularly relevant to those computing devices operating in a network or distributed computing environment wherein the user interface can expose a more extensive library.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the user interface of the invention.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to that concerns the user interface of the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the user interface according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the user interface in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers. 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the user interface of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user interface of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to provide a rich user interface experience for media.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 10c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
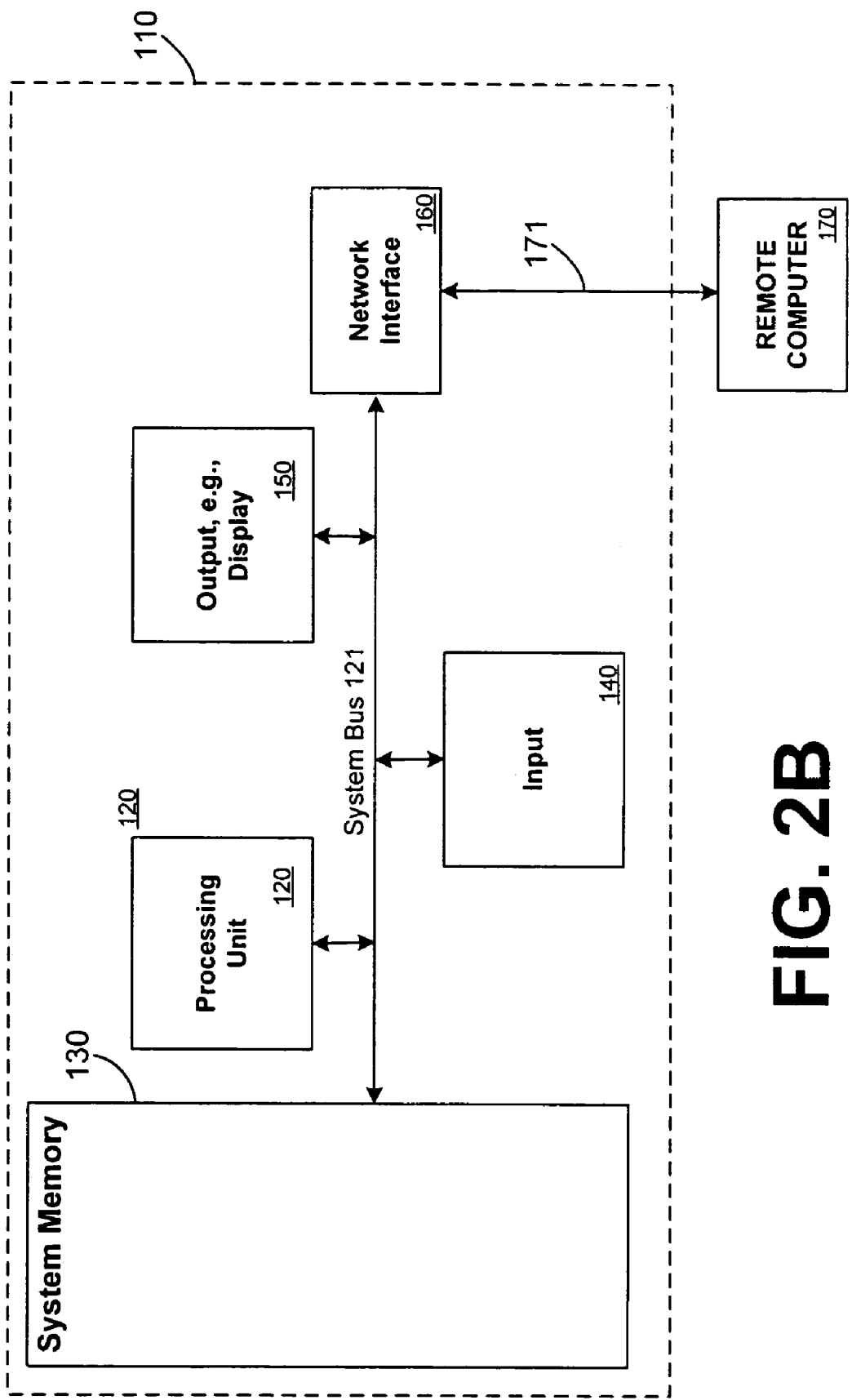
FIG. 2B is a block diagram representing an exemplary non-limiting computing device in which the present invention may be implemented.

FIG. 2B and the following discussion are intended to provide a brief general description of a suitable computing environment for a media device in connection with which the techniques of the invention can be applied with great efficacy. It should be understood, however, that handheld, portable and other computing devices and computing objects of all kinds are contemplated for use in connection with the present invention, i.e., anywhere that a device may wish to provide a rich media navigation experience for playing media. The invention may also be used for non media playing applications wherein it is desirable to present alternate views of an ongoing process depending on the type of process implicated. The general purpose computer described below is but one example, and the present invention may be implemented with any client with or without network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or in a standalone device, such as a portable media player. In essence, anywhere that data may be stored or from which data may be retrieved or transmitted to another computer is a desirable, or suitable, environment for operation of the rich media navigation experience provided by the invention.

Although not required, the invention can partly be implemented via an operating system, for use by a developer of services for a device or object, and/or included within application software that operates in connection with the user interface component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2B thus illustrates an example of a suitable computing system environment 100a in which the invention may be implemented, although as made clear above, the computing system environment 100a is only one example of a suitable computing environment for a device and is not intended to suggest any limitation as to the scope of use or functionality of the invention. Neither should the computing environment 100 be interpreted as having any dependency or requirement relating to any one or combination of components illustrated in the exemplary operating environment 100a. Moreover, while exemplary embodiments are described herein with respect to the navigation of media, such as songs, or movies, the invention is not so limited. Any navigation experience may benefit from the user interface controls of the invention.

With reference to FIG. 2B, an exemplary device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data. structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110, such as during start-up or initiation of an application or user interface, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121 by an interface, such as a removable memory interface.

A user may enter commands and information into the computer 110a through input devices such as a keyboard and pointing device, commonly referred to as a mouse, trackball, touch pad, pen or stylus, etc. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities similar to, but different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2C include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods for interacting with a media rendering experience in accordance with the invention may be included in, supported in or accessed via all of the languages and services enabled by managed code, such as .NET code, and in other distributed computing frameworks as well.

Systems and Methods for Providing Alternate "Now Playing" Views

As mentioned above, the invention presents alternate "Now Playing" views via a user interface for a "Now Playing" state associated with the rendering of media, e.g., for a portable media player. In one aspect of the user interface of the invention, a user can quickly return to the "Now Playing" state. In this regard, in one embodiment, from any screen in the user interface, the user is at most two interface control element inputs, e.g., two clicks, away from the "Now. Playing" state or place. Also, the user does not have to select something new to play in order to get to the "Now Playing" state.

In accordance with another embodiment, when a media device including the user interface of the invention is turned on, it begins at the "Now Playing" state in pause. The user merely presses the PLAY control in order to resume whatever was playing when the device was last turned off.

From the user's perspective, the user interface of the invention includes at least two distinct places or states: the "Now Playing" place and the "Library" place. The "Now Playing" place is where media playback occurs. The "Now Playing" place provides multiple views of the currently playing media objects, as appropriate to the media type of the media object, and playback settings, also as appropriate to its media type.

The "Library" place is where a user can choose what to play next, or what to queue up for later. The Library allows the user to browse through their media files using drill-down techniques that let users select broad categories and then progressively refine their search. Also, the general device settings may be accessible through the Library.

Figure 3A:
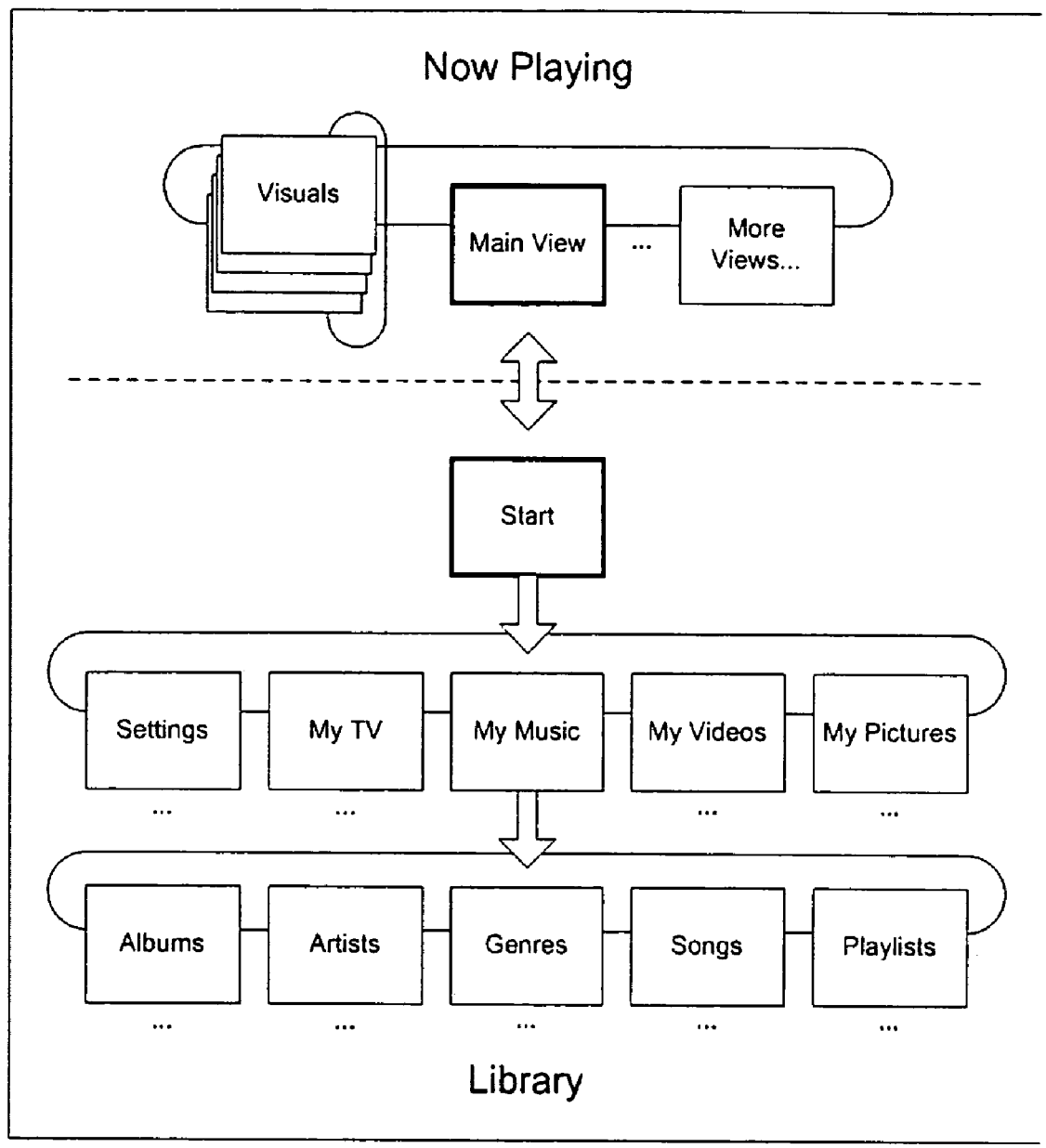
FIGS. 3A and 3B are block diagrams illustrating state transitioning with respect to the "Now Playing" state in accordance with the invention.

FIG. 3A represents exemplary structure of a non-limiting user interface in accordance with the invention, wherein screens are represented as rectangles. The ovals mark sets of screens through which a user can toggle, wherein each of the screens represents a view of a current place in the user interface. For instance, with respect to a horizontally oriented oval, a user can switch between screens by pressing the LEFT and RIGHT buttons. With respect to a vertically oriented oval, e.g., Visuals, a user can switch between screens by pressing the UP and DOWN buttons. In accordance with the invention, whenever a user navigates to one of these sets of screens, i.e., ovals in the figure, the user is taken to the particular screen where the user was most recently. If it is the user's first time at the set of screens, or the most recent screen is no longer applicable for some reason, the user is taken to the default screen, e.g., first screen, assigned to the set. The large arrows indicate broader navigation: moving from place to place or drilling down into the Library.

Figure 3B:
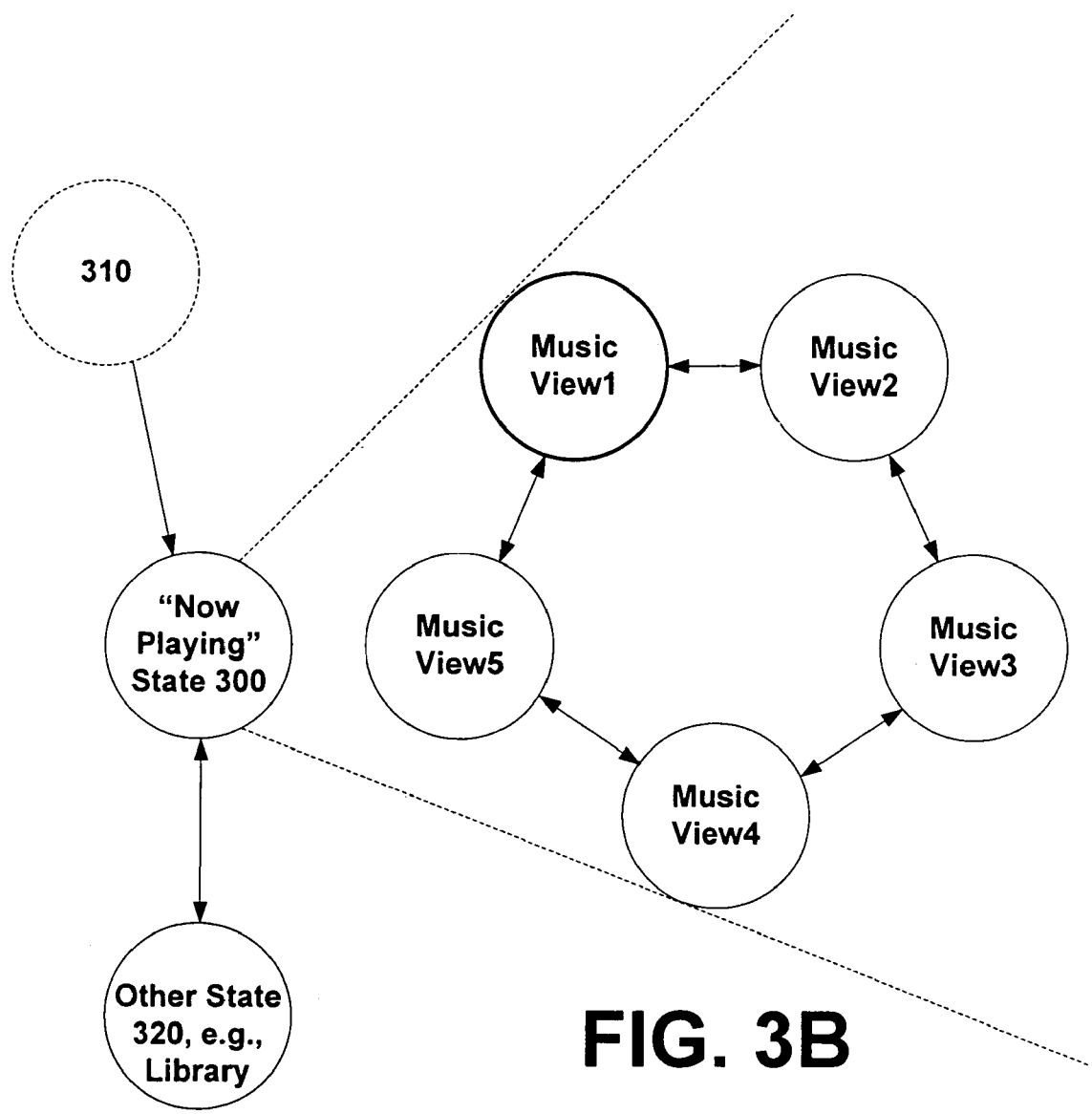
Figure 3C:
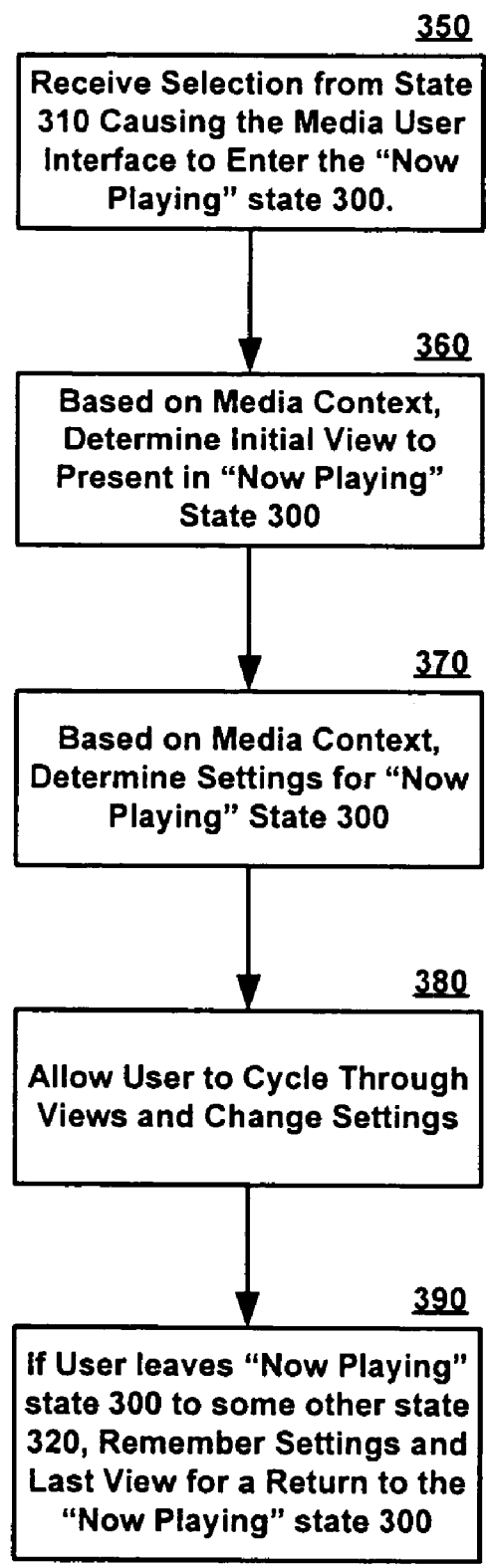
FIG. 3C is a flow diagram illustrating exemplary aspects of state transitioning in the "Now Playing" state in accordance with the invention.

The diagram of FIG. 3B and the flow chart of FIG. 3C illustrate exemplary representations of the user interface of the invention wherein a user navigates to the "Now Playing" state 300 from some other state 310 of the user interface, either implicitly (e.g., selecting a song to play) or explicitly (e.g., go to the "Now Playing" state 300). In FIG. 3B, the "Now Playing" views are a list of views the user can cycle through to select one. By default, a particular view, e.g., Music View 1, may be displayed the first time the user arrives at the "Now Playing" state for the particular type or item of media. Thereafter, the user may cycle to another music view, e.g., Music View3. As a result, when the user leaves the "Now Playing" state 300 and navigates to some other state 320, e.g., the media library, if the user returns to the "Now Playing" state 300 for another object of the same media type, Music View3 will be presented initially. Thus, in accordance with the invention, a "Now Playing" state 300 is a place for a user to experience via a plurality of views the rendering of a selected media object. Based on the context from which the user interface arrives at the "Now Playing" state 300, based on the type of media object (e.g., Recorded TV, Pictures, Video and Music), and based on the configurable settings for the type of media object, the views are generated for the user's enjoyment.

In FIG. 3C, an exemplary user interface experience in accordance with the invention begins at 350, wherein the media device enters the "Now Playing" state 300 from some other state 310. At 360, based on the. context of entry to the "Now Playing" state 300 and the type of media object implicated, an initial view is presented for the "Now Playing" state. This can be set by default to one of the views, or it may be the last view selected by the user for the media object, or type of media object. At 370, based on the type of the media object implicated, the settings for views are determined. These settings may be by default or according to the last user experience for the media object, or type of media object. At 380, the user can cycle through the views of the "Now Playing" state 300. In one embodiment, if a user leaves the "Now Playing" state 300 to navigate to some other state 320 at 390, then the settings for the views presented at 360 to 380 and the last view presented before the user navigates to state 320 are stored for when the user returns to the "Now Playing" state.

As mentioned, in exemplary non-limiting embodiments of the invention, when the user first turns- on the device, the device starts at the "Now Playing" place in the paused state, with whatever content the user was most recently playing. If there is no such content, e.g., the content was removed in the last media synchronization process of the device, the device starts in the Library for a new selection.

Describing in more detail an embodiment of the invention, the "Now Playing" place is a horizontal band of screens including a plurality of views of the currently playing media and a playback settings screen. Importantly, while the place in the user interface remains the same, the set of views presented depends on type of media being played. For instance, for music, there may be views including various levels of detail for the currently playing song and/or collection, a set of visualizations through which a user can toggle, e.g., using the up and down buttons, and a music playback settings screen. For recorded TV content, e.g., there may be a full screen view of the playing TV show, and two views of the TV show metadata. For video, there may be a full screen view of the playing video and a view of the video's file information. For pictures, there may be full screen views of the picture in each orientation, a view of a picture's file information, e.g., overlaid on the picture, and a slideshow settings screen.

Figure 4:
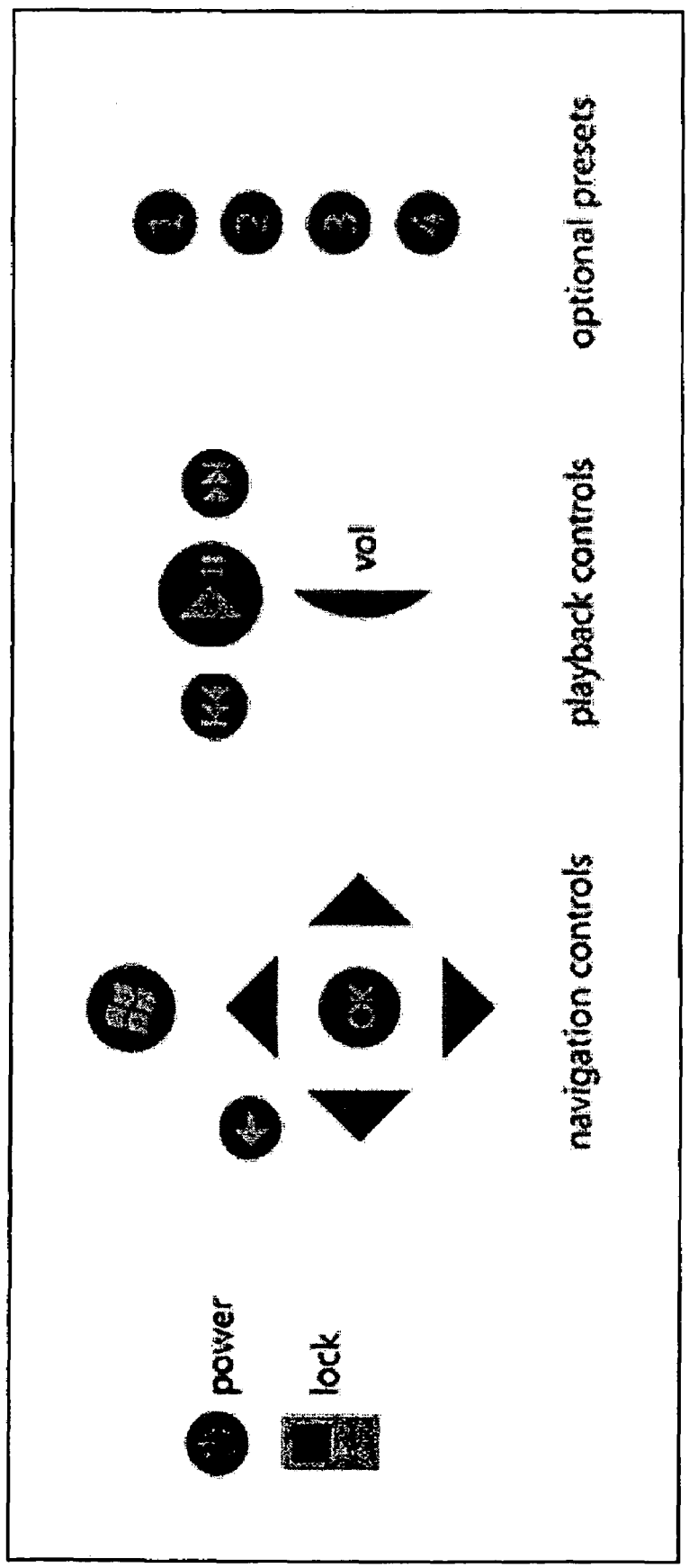
FIG. 4 is an exemplary set of user interface controls in conjunction with which the user interface experience of the present invention may be implemented.

FIG. 4 illustrates exemplary non-limiting user interface control elements that may be used in connection with the present invention. By clicking the PLAY button, a user toggles between play and paused state in the "Now Playing" place of the invention. PLAY, REV and FF only affect playback of what is currently playing (or paused) in Now Playing. When navigating a list of options, clicking the UP (or DOWN) button selects the previous (or next) item in the list. In the audio visualizations in the "Now Playing" place, for instance, the UP and DOWN buttons move through the set of visualizations.

Figure 5:
FIG. 5 illustrates an exemplary "Now Playing" view of the invention having a battery indicator.

As illustrated in FIG. 5, in one embodiment of the invention for portable media devices, in the lower right corner of screen(s) in the "Now Playing" place that do not involve full-screen video, there is a battery indicator icon BI which shows how much charge the battery of the device holds. A half-charged battery will be represented by a half-filled icon, for instance. When music is currently active in the "Now Playing" place, there may also be icons indicating whether playback is in Shuffle and/or Repeat mode.

As discussed above, the "Now Playing" place is where the user goes to enjoy media files, i.e., listen to music, play video content (TV content as well as other kinds of video), and watch slideshows. Each media type has different playback capabilities and different available metadata and thus, the "Now Playing" place functions differently for each media type.

For instance, for recorded video content, e.g., TV or Video, there may be provided in accordance with the invention a full screen view of the playing media. A small overlay view may also be presented with program or file information. For TV content, there may also be a full screen description of the program being watched. For Music, there are different views showing various degrees of metadata and visuals, or the list of currently playing tracks. For Pictures, there may be presented a view with a full screen view of the picture and there may be overlay views sharing various levels of information about the picture.

FIGS. 6A-6B illustrate exemplary non-limiting implementations of "Now Playing" views for rendering TV content in accordance with the invention. FIG. 6A illustrates an exemplary "Recorded TV" view 600. FIG. 6B illustrates an exemplary "TV Episode Info" view 610 that partially or completely overlays TV episode or other video file information on the rendering screen or shows title of the episode, synopsis, length, and/or rating. Another view (not illustrated) might be a "Full Screen" view which would be similar to view 600, but showing only the video or TV content playing. The screens or views in the "Now Playing" place for recorded TV are conceptually arranged from left to right in an order that may wrap around circularly. For instance, the initial view may be the Full Screen TV view. The user can use the LEFT and RIGHT buttons to cycle through the TV views. If the user falls off the left or right end of the list of views, the position in the user interface is moved back to the opposite side.

Figure 7A:
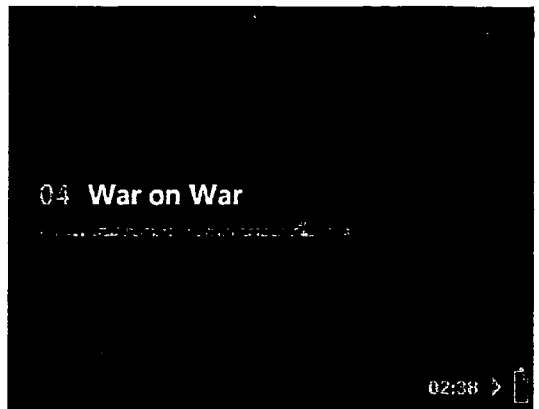
FIGS. 7A to 7E illustrate exemplary non-limiting implementations of "Now Playing" views for rendering Music content in accordance with the invention.
Figure 7B:
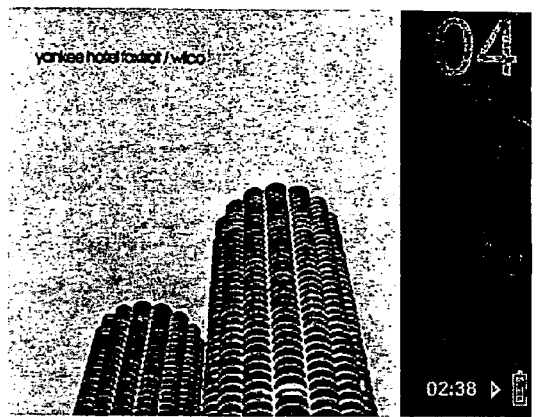
Figure 7C:
Figure 7D:
Figure 7E:
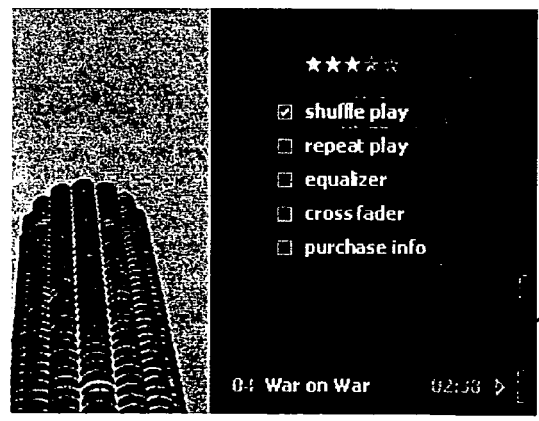

FIGS. 7A-7E illustrate exemplary non-limiting implementations of "Now Playing" views for rendering Music content in accordance with the invention. FIG. 7A illustrates an exemplary "Song" view 700 showing, e.g., the name of the song, the playing position and the track number of the song. With view 700, the user is presented with information such as song name, track number, elapsed time, and an elapsed time status bar. FIG. 7B illustrates an exemplary "Big Album Cover" view 710 showing, e.g., a picture of the album cover, the track number and the playing position. With view 710, the user is presented with a large album art picture, artist, album name, song name, and elapsed time. For albums that are missing album cover art metadata, a default album cover art image is used. FIG. 7C illustrates an exemplary "Track List" view 720 showing, e.g., part of the album cover, the songs on the album in a list with the currently playing song highlighted or emphasized and the playing position. With view 720, the user can scan through the tracks in the current playlist (or album) using the UP and DOWN buttons. Pressing the OK button causes playback to skip forward or back to the selected track. FIG. 7D illustrates an exemplary "Small Album Cover" view 730 showing, e.g., a smaller picture of the album cover, the name and track number of the song and the playing position. With view 730, the user is presented with a medium-sized album art, artist, album name, song name, elapsed time, and an elapsed time status bar. For albums that are missing album cover art metadata (or where the album cover art is broken/corrupt), a default album cover art image may be used. FIG. 7E illustrates an exemplary "Music Settings" view 740 for configuring settings associated with or otherwise related to the play of the music and showing, e.g., part of the album cover, the name and track number of the song being played and the playing position. With view 740, the user is presented with checkboxes for Shuffle, Repeat, Equalizer, Cross-fade, and Auto-level. The user can move through the settings using the UP and DOWN buttons. Pressing the OK button toggles the checked state of the setting. Below the checkboxes, the user may be presented with a means for updating the Star Rating for the current song.

The views in the "Now Playing" place for music are arranged from left to right in wraparound order. An initial or default view, for instance, may be view 730. The user can use the LEFT and RIGHT buttons to cycle through all the music views. If the user falls off the left or right end of the list of views, the view is moved back to the opposite side.

In the music settings view, e.g., view 740 of FIG. 7E, the user can select to shuffle and/or repeat the current collection of music, i.e., album, playlist or queue. If the user elects to shuffle the collection, the collection of music is rearranged in a random order. In one embodiment, if the user elects to repeat the collection, the collection is automatically replayed when the end of the collection is reached. In another embodiment, when the user elects to shuffle and repeat the collection, the collection is reshuffled each time that it is repeated.

FIGS. 8A-8C illustrate exemplary non-limiting implementations of "Now Playing" views for rendering Picture content in accordance with the invention. FIG. 8A illustrates an exemplary "Pictures Information" view 800 showing, for instance, the picture in full screen view, the name of the picture or photo album and a date associated with the picture. FIG. 8B illustrates an exemplary "Pictures Settings Now Playing" view 810 for configuring settings associated with or otherwise related to the rendering of a picture. With view 810, the user can specify whether the pictures are displayed in random order, how long to display each image, with what orientation to view the current picture, etc. In one embodiment, with view 810, when the user presses OK with the control selected, the choice cycles through all of the possible choices. FIG. 8C illustrates an exemplary "Pictures and Music Information" view 820 when a picture slideshow and music playback are concurrent. Another view (not shown) is a "Picture Full Screen" view that is a full screen of the picture. With view 820, filename and date are shown in an overlay across the bottom of the picture along with an indication of the picture's current place within the slideshow, e.g., "3 of 72" indicating that this is the third picture in a 72 picture collection. For song overlay in the picture view 820, the metadata relating to the song may but need not persist. For instance, in one embodiment, the song information appears for a predetermined amount of time when a song changes. If there is music playing during the slideshow, an overlay appears showing the currently playing song, its associated album, and album art. The overlay may also show battery, playback, repeat and shuffle state.

The screens or views in the "Now Playing" place for picture slideshows are arranged from left to right in wraparound order. For example, the initial view may be a full screen picture view. The user can use the LEFT and RIGHT buttons to cycle through the slideshow views. If the user falls off the left or right end of the list of views, the user interface returns to the view on the opposite side, i.e., the views wrap circularly to the other side.

Also, in an alternate implementation of the slideshow views, while viewing a slideshow the pictures in the slideshow serve as "views" by themselves, i.e., pressing UP and DOWN skips through the pictures, wherein each picture represents a view of the slideshow.

FIGS. 9A-9B illustrate exemplary non-limiting implementations of "Now Playing" views for rendering video content in accordance with the invention. FIG. 9A illustrates an exemplary "Full Screen" view 900. FIG. 9B illustrates an exemplary "Video File Info" view 910 that partially or completely overlays video file information on the rendering screen, e.g., shows any one or more of the name of the video, length, date, summary and/or rating. Another view (not illustrated) might be another "Full Screen" view which would be similar to view 900, but showing only the video content playing. The screens or views in the "Now Playing" place for video are conceptually arranged from left to right in an order that may wrap around circularly. For instance, the initial view may be the Full Screen view 900. The user can use the LEFT and RIGHT buttons to cycle through the video views. If the user falls off the left or right end of the list of views, the position in the user interface is moved back to the opposite side.

In one non-limiting implementation of playback controls of a media rendering user interface implemented in accordance with the invention, within the "Now Playing" state, the playback controls reverse (REV), play (PLAY) and fast forward (FF) buttons are used to control the playback of the currently playing media item. See, e.g., FIG. 4, for an illustrative embodiment of REV, PLAY and FF button controls. Also, if the user is listening to music while browsing in the library, the playback controls REV, PLAY and FF function accordingly. In one embodiment, clicking the REV, or FF, button skips backward (or forward) in the rendering of the media, while pressing and holding the REV, or FF, button fast reverses, or fast forwards, e.g., accelerates, the rendering of the media, respectively. On the other hand, remote controls for a media device in accordance with the invention may include separate skip and scan buttons for both forward and backward.

In the "Now Playing" place, in one embodiment, when the currently playing media file (or collection) plays to completion, the user is taken back to the screen in which they originally chose to play the media file (or collection). For example, if the user goes to Recorded TV and begins playing one of the TV programs, then, when it is done, the user is taken back to Recorded TV.

In another embodiment, setting a preset in the "Now Playing" state associates the current playlist, album, slideshow, video or TV show with the preset. With respect to associating the queue with a preset, the preset can be associated with the concept of the queue, e.g., every time the preset is input, the contents of the queue are played, or the preset can be associated with the contents of the queue, e.g., every time the preset is input, the songs that were in the queue get played.

Based on a Multilingual User Interface (MUI), the user is allowed to change the default UI language setting on the device to one of the supported UI languages. Thus, language may be a setting that the user configures through the settings option of the UI. In one embodiment, on selection of a new language, a notification is sent to change the language on the device and initiate a warm boot. As a result, OEMs can easily support multiple languages on the device. Since OEMs sell devices into different markets, they will want to manufacture one device with all of the supported languages on it instead of manufacturing custom images and devices for each international market.

There are multiple ways of implementing the present invention, e.g., an appropriate API, tool kit, driver code, operating system, control, standalone or downloadable software object, etc. which enables applications and services to expose the user interface of the invention. The invention contemplates the use of the invention from the standpoint of an API (or other software object), as well as from a software or hardware object that exposes the views provided in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to experience media. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

Aspects(s) of the present invention may be implemented in or across a plurality oprocessing chips or devices, and storage may similarly be effected across a plurality of devices. Therefore, the present invention should not be limited to any single embodiment, but rather should be construed in breadth and scope in accordance with the appended claims.

What is claimed is:

1. A user interface for a computing device for use in connection with rendering a media object, comprising:
a computing device display associated with a computing device for viewing a rendering of the media object; and a "Now Playing" state to which a user navigates to render the media object, the "Now Playing" state comprising a plurality of views based on the type of the media object being rendered through which a user cycles via at least one input component when deciding upon a view for rendering the media object, wherein the first time a user navigates to the "Now Playing" state for a type of media object, a default initial view of the plurality of views is presented to the user.

2. A user interface according to claim 1, wherein the plurality of views are presented according to characteristics determined by configurable settings changed by the user.

3. A user interface according to claim 1, wherein when the user leaves the "Now Playing" state of the user interface by navigating to another state, at least one of the settings and the last view viewed in the "Now Playing" state are stored so that the user is represented with the same view when the user returns to the "Now Playing" state for another media object of the same type.

4. A user interface according to claim 1, wherein the plurality of views include at least one of a full screen view and a view of the metadata associated with the media object.

5. A user interface according to claim 1, wherein the plurality of views are configurable to display in available languages via a multilingual user interface.

6. A user interface according to claim 1, wherein the type of the media object is one of Recorded TV, Music, Video and Picture.

7. A user interface according to claim 1, further comprising preset button interface elements for entering the "Now Playing" state based upon at least pre-defined playlist.

8. A computer readable medium comprising computer executable modules having computer executable instructions for implementing the user interface of claim 1.

9. A computing device comprising the user interface of claim 1.

10. A modulated data signal carrying computer executable instructions for implementing the user interface of claim 1.

11. A method for interfacing with the rendering of a media object via a user interface of a computing device and implemented on the computing device, comprising:
receiving a selection of a playing state for rendering the media object via at least one interface control element of the user interface;
presenting an initial view of a plurality of views in the playing state on a display of the computing device by way of the user interface, the presented initial view being selected based on the type of the media object being rendered;
allowing a user to cycle by way of the user interface through the plurality of views via the at least one interface control element when the user is deciding upon a view for rendering the media object; and when the user leaves the playing state, storing at least one of the settings and the last view viewed in the playing state so that the user is presented with the last view as the initial view when the user returns to the playing state for another media object of the same type.

12. A method according to claim 11, wherein the presenting of the plurality of views includes presenting the plurality of views according to characteristics determined by configurable settings changed by the user.

13. A method according to claim 11, wherein one view of the plurality of views is a default initial view.

14. A method according to claim 11, wherein the plurality of views include at least one of a full screen view and a view of the metadata associated with the media object.

15. A method according to claim 11, further including configuring the plurality of views to display in a different language via a multilingual user interface.

16. A method according to claim 11, wherein the type of the media object is one of Recorded TV, Music, Video and Picture.

17. A computer readable medium comprising computer executable modules having computer executable instructions for carrying out the method of claim 11.

18. A computing device comprising means for performing the method of claim 11.

19. A modulated data signal carrying computer executable instructions for performing the method of claim 11.

20. A computing device, comprising:
a display;
a computer readable medium comprising computer executable modules comprising computer executable instructions configured to interact with the display and enabling a user to interact with the playback of a media object by a media player via a user interface including a playing state to which a user navigates to render the media object,
the playing state comprising a plurality of views based on the type of the media object being rendered, the user interface allowing a user to cycle through the plurality of views based on preference via at least one input component when deciding upon a view for rendering the media object, wherein the first time a user navigates to the playing state for a type of media object, a default initial view of the plurality of views is presented to the user.

21. A computing device according to claim 20, wherein the plurality of views are presented according to characteristics determined by configurable settings, changed by the user.

22. A computing device according to claim 20, wherein when the user leaves the playing state of the user interface by navigating to another state, at least one of the settings and the last view viewed in the playing state are stored so that the user is presented with the same view when the user returns to the playing state for another media object of the same type.

23. A computing device according to claim 20, wherein the plurality of views include at least one of a full screen view and a view of the metadata associated with the media object.

24. A computing device according to claim 20, wherein the plurality of views are configurable to display in available languages via a multilingual user interface.

25. A computing device according to claim 20, wherein the type of the media object is one of Recorded TV, Music, Video and Picture.

26. A computing device for interacting with media objects including a user interface for rendering a media object, the user interface of the computing device being implemented on the computing device, comprising:
means for receiving a selection of a playing state for rendering the media object via at least one interface control element of the user interface;
means for presenting an initial view of a plurality of user selectable views in the playing state on a display of the computing device by way of the user interface, the presented initial view being selected based on the type of the media object being rendered;
means for allowing a user to cycle by way of the user interface through the plurality of views via the at least one interface control element when the user is deciding upon a view for rendering the media object; and means for configuring the plurality of views to display in a different language via a multilingual user interface.

27. A computing device according to claim 26, further comprising:
means for storing at least one of the settings and the last view viewed in the playing state, whereby when the user returns to the playing state for another media object of the same type, said means for presenting presents an initial view based on at least one of the settings and the last view.

28. A computing device according to claim 26, wherein the type of the media object is one of Recorded TV, Music, Video and Picture.

* * * * *